United States Patent [19]
Kuelzer

[11] Patent Number: 4,485,950
[45] Date of Patent: Dec. 4, 1984

[54] EXCHANGEABLE TRANSPORTATION DEVICE FOR MARGINALLY PERFORATED DATA CARRIERS

[75] Inventor: Peter Kuelzer, Hochstadt, Fed. Rep. of Germany

[73] Assignee: Siemens Aktiengesellschaft, Berlin & Munich, Fed. Rep. of Germany

[21] Appl. No.: 447,682

[22] Filed: Dec. 7, 1982

[30] Foreign Application Priority Data

Dec. 15, 1981 [DE] Fed. Rep. of Germany ....... 3149997

[51] Int. Cl.[3] .............................................. G03B 1/30
[52] U.S. Cl. .................................... 226/74; 400/616.1
[58] Field of Search ................... 226/74, 75, 170, 171, 226/172, 173; 271/34, 35; 400/616–616.2, 618

[56] References Cited

U.S. PATENT DOCUMENTS

| | | | |
|---|---|---|---|
| 4,344,715 | 8/1982 | Van Horne et al. | 400/616.1 |
| 4,400,105 | 8/1983 | Yeager et al. | 400/616.1 |
| 4,402,623 | 9/1983 | Biche et al. | 400/618 |

*Primary Examiner*—Leonard D. Christian
*Attorney, Agent, or Firm*—Hill, Van Santen, Steadman & Simpson

[57] ABSTRACT

A powered paper transport for use in association with platen machines, such as typewriters and printers, utilizing perforated margin paper. The transport mechanism is attachable and detachable adjacent the platen, is driven from the platen and is displaceable relative to the platen to provide a desired bias force on the paper between the platen and the tractor drive of the transport. Adjustable stop means are provided to limit the displaceability.

10 Claims, 1 Drawing Figure

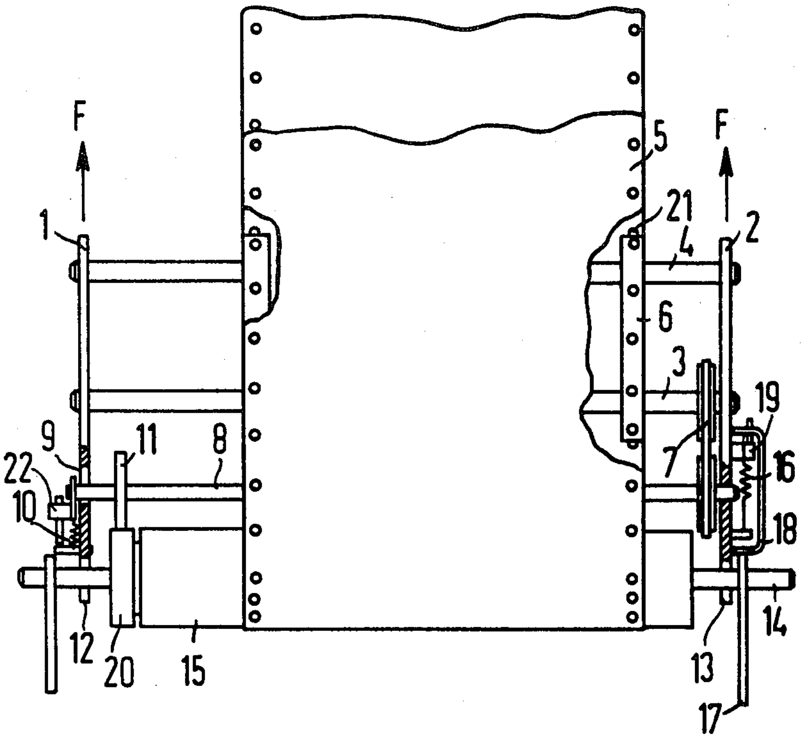
F
F
5
21
1
2
4
6
3
19
9
11
8
22
7
16
10
18
12
20
15
13
14
17

EXCHANGEABLE TRANSPORTATION DEVICE FOR MARGINALLY PERFORATED DATA CARRIERS

BACKGROUND OF THE INVENTION

1. Field of the Invention

This invention relates to paper transport devices of the type utilized in connection with typewriters and printers having powered platens.

2. Prior Art

Transport devices for use in connection with margin perforated data carries, such as paper, wherein the transport is attachable to, and detachable from, the printer or typewriter are known.

In order to provide controlled movement of endless paper webs which are provided with left and right hand margin perforations and which are used in connection with printers, such as typewriters and the like, it has been known to provide paper transport devices adjacent the platen. The transport device may be coupled to the drive of the platen and may include toothed members engaging in the paper perforations. The toothed members, which may be sprockets or belts having projecting teeth, are commonly referred to as tractors or tractor drives. It is generally desirable to maintain a bias between the tractor drive and the platen.

Such bias, which is necessary for reliable and distortion-free transportation of the paper, is generally provided by stretching the installed paper web across a clamp or clamp roller positioned over the paper web. Such clamps are not always effective and can smear the print. It is also possible to produce the desired bias by displacing the tractors relative to the platen by means of mechanical devices. However, the prior bias creating methods require special measures and devices to produce the desired bias (stretch load) on the paper. It would therefore be an advance in the art to provide an improved attachable and detachable paper transport mechanism for use in connection with platen printing or typing devices which assures slip-free transportation of multi-layer marginal perforated paper webs, both forward and backward, by maintaining an effective bias on the web between the platen and the tractor mechanism.

SUMMARY OF THE INVENTION

It is therefore the principle object of this invention to provide a simple attachable paper transport device for printers which facilitates slip-free transportation of multi-layer paper webs in both forward and backward directions.

This principle objective is realized according to this invention in that the transport device includes guide elements having springs which serve to attach the transport mechanism to the printer in a longitudinally displaceable fashion with a spring applied bias.

Since the entire paper transport mechanism is not fixedly and permanently attached to the printer, but is spring attached vis-a-vis the position of the platen, the tension between the tractors and the platen, necessary for proper transportation of the paper web, is automatically provided. The paper webs are held taut without any undesired deflection and when the transport device is used in ink printers, for example, jet ink printers or the like, any print that is not dry on the data carrier is prevented from being smudged by a clamp or roller mechanism. Overstretching of the transportation perforations of the paper web is prevented by adjustable stop means which limit the amount of permissible displacement between the tractor device and the platen.

It is therefore a more specific general object of this invention to provide a transport mechanism for paper webs for use in connection with printers where the tractors of the transport mechanism are relatively moveable with respect to the platen of the printer and where spring means maintains a bias on the paper web by biasing the tractors away from the platen.

It is another, and more specific, object of this invention, to provide a removable transport device for platen equipped printers, the transport device having tractor belts with teeth for engaging the marginal perforations of an endless paper web passed around the platen, and spring means providing a bias between the tractor bends and the platen to maintain proper tension on the paper web.

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure, and in which:

AS SHOWN ON THE DRAWING

The drawing is a partially sectional elevational view of a transport device according to this invention positioned with respect to a platen.

DESCRIPTION OF THE PREFERRED EMBODIMENT

The single drawing schematically illustrates a removable and exchangeable transport device. The device is shown in installed position vis-a-vis a printer platen.

The removable transport device for use with marginally perforated data carriers, such as paper webs, consists of left and right hand side frame components, 1 and 2, which are herein referred to as first and second plates 1 and 2. Positioned between the plates is a tractor drive which comprises two parallel tractor shafts 3 and 4 journalled in the plates 1 and 2. Tractor belts 6 provided with perforation engaging teeth 21 extend endlessly between shafts 3 and 4. The teeth 21 engage marginal perforations of the paper web 5 which may, for example, be a multi-sheet web.

Tractor shaft 3 acts as a driveshaft of the transport and is driven by intermediate driveshaft 8 by means of belt drive 7. Shaft 8 is journalled in plate 2 and projects through a elongated slot 9 of plate 1. A spring member 10 is attached to the left hand end of shaft 8 external of plate 1 and has its other end affixed to a projection of plate 1. In this manner, shaft 8 is drawn downwardly with respect to plate 1. A stop member, shown as bracket 22 affixed to the left hand end of shaft 8, may be equipped with an adjusting screw engageable with the projection of plate 1 to which the bottom end of spring 10 is affixed. Thus, by extending or retracting the setting screw, the maximum amount of spring urged relative movement of plate 1 with respect to shaft 8 in the direction of arrow F can be limited. Shaft 8 also includes drive wheel 11 pinned to the shaft which engages counterdrive wheel 20 of platen 15.

At their bottom ends, plates 1 and 2 are provided with open ended recesses 12 and 13, which serve as guide elements and engage the shaft 14 of platen 15 of the printer when the transport device is received in proper position on the printer. The slots 20 and 13 allow for relative movement between the plates 1 and 2 and the shaft 14 while maintaining a guiding and positioning function, assuring that the transport device will be properly positioned with respect to the platen.

Plate 2 is connected to the printer (not shown) through the intermediary of spring 16, U-shaped component 18 and locking member 17. Member 17 is adapted to be in engagement with the printer in a known fashion. For example, component 17 may take the form of a post received in a socket in the printer housing and may be retained therein by means such as set screws and the like. In this manner, U-shaped member 18 is fixed in position. Spring 16 has its bottom end attached to a projection carried by plate 2 and its upper end attached to the upper arm of the U-shaped member 18. In this manner, the spring will draw plate 2 upwardly in the direction of arrow F. A further projection 19 affixed to plate 2 may engage a limit stop abutting screw carried by component 18, thereby limiting the upward movement of plate 2 with respect to bracket 18. Since bracket 18 is affixed to the printer housing through component 17, the maximum vertical movement of plate 2 under the influence of spring 16 can be limited.

If, for example, a printer, which may be an ink printer, is to be used in connection with the transport device according to this invention to print endless paper provided with marginal perforations, the exchangeable transport device illustrated is first positioned with respect to the axis 14 of the platen 15 with the axis received in slots 12 and 13. Simultaneously, the locking component 17 is locked in a recess provided for this purpose in the printer housing. Under action of spring 10, the gear wheel or drive wheel 11 of the intermediate shaft 8 is brought into contact with gear wheel or drive wheel 20 connected to the platen shaft. It is to be understood that the gear or drive wheels could include friction drives, etc. As a result of the spring force action of the spring 10 drawing shaft 8 against the drive connection 11–20, plate 1 will be forced upwardly. Substantially the same upward force is generated on the right hand side where spring 16 interposed between the fixed position U-shaped component 18 and the projection of plate 2 will cause plate 2 to be drawn upwardly. Both sides have their upward movement limited by the limit stop screw member devices previously described. By engaging the teeth 21 of the drive belt 6 with the marginal perforations of the paper 5, initially in a taut condition where the springs have not yet drawn the plates to their maximum position, it is assured that the data carrier will be held tautly between the platen and the tractor means. However, by proper adjustment of the limit stops 19 and 22, it can be assured that the maximum upward movement of the plates 1 and 2, subsequent to engagement of the tractor teeth with the paper will not be so great as to deform the transport perforations of the paper web.

It can therefore be seen that this invention provides an improved paper transport for use in connection with platen equipped printer mechanisms utilizing marginally perforated paper webs. The transport mechanism, including spaced tractor means, is mounted for limited vertical movement with respect to the platen and is spring urged away from the platen to maintain a substantially constant tension on the paper web between the platen and the tractor means. Adjustable limit abutment means are provided for limiting the movement of the tractor means away from the platen. The same spring means which is used to provide bias on the paper is also used to assure engagement of the tractor drive with the platen shaft drive.

It will of course be appreciated that variations of this invention may be provided by those skilled in the art. For example, springs 10 and 16 could be provided as adjustable or as exchangeable springs allowing variations in the degree of bias provided. Additionally, although not illustrated, it will be readily apparent that the tractor belts 6 are moveable longitudinally of shafts 3 and 4 to accommodate different widths of paper. It will further be understood that the transport mechanism is guided in position on the printer by reason of the slots or recesses 12, 13, being in position on the platen axis.

I claim as my invention:

1. A transport device for use in connection with rotatable roller platen equipped printers comprising frame means, open ended slot means on said frame means for receipt of an axis platen shaft of the platen effective to position the frame means in longitudinal alignment with the platen, tractor means carried by said frame means, a drive connection between said platen shaft and said tractor means, whereby rotation of said platen shaft effects movement of said tractor means and spring means urging said frame means away from said platen in the direction of extension of a paper web received around said platen.

2. A device according to claim 1, wherein the spring means includes a first spring acting between a portion of said frame means and a drive shaft carried by said frame means having drive means engageable with a drive means carried by said platen.

3. A device according to claim 2, wherein said spring means includes a second spring acting between the frame means and a member affixable to the printer housing.

4. A transport device for roller platen equipped printers comprising first and second spaced side plates, said side plates having bottom end portions having guide slots receiving an axis of the platen, a drive shaft carried between said side plates, said drive shaft moveable with respect to at least one of said side plates, inter-engaging drive members on said drive shaft and said platen axis, spring means acting between said drive shaft and said first side plate effective to urge said inter-engaging drive means against one another and to bias said first side plate away from said platen axis and second spring means effective to urge said second side plate away from said platen axis.

5. A device according to claim 4, wherein said second spring means includes a spring member acting between said second side plate and a bracket member affixable to a housing of the printer in fixed position relative thereto.

6. A device according to claim 5, including limit stop means limiting movement of said first and said second side plates away from said platen axis.

7. A device according to claim 6, including a rotatable tractor shaft carried by said side plates, drive means between said drive shaft and said tractor shaft and paper transport tractors carried by said tractor shaft having means for engaging marginal perforations on a paper web received around said platen.

8. An attachable paper transportation device for edge perforated paper webs in printers where the paper web extends at least partially around a driven platen carried by the printer and engages tractors carried by the transportation device, the improvement of the transportation device including guide elements effective to position the transportation device aligned with the axis of the platen while allowing movement of the transportation device normal to the axis of the platen, and spring means biasing the transportion device away from the axis of the platen.

9. Device according to claim 8, including stop means limiting displacement of the transportation device relative to the platen axis under the influence of the spring means.

10. Device according to claim 9, wherein the transportation device comprises first and second side plates provided with guide slots which receive the platen axis, said plates carrying a tractor drive shaft and an intermediate shaft, said intermediate shaft having one end displaceable relative to one of said plates, spring means acting between said one end and said one of said plates, drive means between the intermediate shaft and the tractor shaft, second drive means between the tractor shaft and the platen, said second drive means positioned adjacent the one end, the said first spring effective to force engagement of the second drive means and upon forced engagement of the second drive means to bias the one of said plates away from said platen, a bracket member affixable to a housing of the printer in fixed position relative thereto, and a second spring means acting between said bracket member and another of said side plates and effective to bias the another of said side plates away from said platen.

* * * * *